United States Patent
Kim et al.

(10) Patent No.: US 8,422,258 B2
(45) Date of Patent: Apr. 16, 2013

(54) MAXIMUM POWER POINT TRACKER, POWER CONVERSION CONTROLLER, POWER CONVERSION DEVICE HAVING INSULATING STRUCTURE, AND METHOD FOR TRACKING MAXIMUM POWER POINT THEREOF

(75) Inventors: Jin Wook Kim, Seoul (KR); Tae Won Lee, Gyunggi-do (KR); Dong Seong Oh, Incheon (KR); Yong Hyok Ji, Gyunggi-do (KR); Byoung Kuk Lee, Gyunggi-do (KR); Chung Yuen Won, Gyunggi-do (KR); Jae Hyung Kim, Gyunggi-do (KR); Young Ho Kim, Seoul (KR)

(73) Assignees: Samsung Electro-Mechanics Co., Ltd. (KR); Sungkyunkwan University Foundation for Corporate Collaboration (KR)

( * ) Notice: Subject to any disclaimer, the term of this patent is extended or adjusted under 35 U.S.C. 154(b) by 352 days.

(21) Appl. No.: 12/881,624

(22) Filed: Sep. 14, 2010

(65) Prior Publication Data
US 2011/0242857 A1 Oct. 6, 2011

(30) Foreign Application Priority Data
Apr. 2, 2010 (KR) .................. 10-2010-0030538

(51) Int. Cl.
*H02M 7/537* (2006.01)
*G05F 1/44* (2006.01)

(52) U.S. Cl.
USPC ............................ 363/97; 323/299; 323/906

(58) Field of Classification Search .............. 363/2, 124, 363/80, 95, 97, 131; 323/299, 906
See application file for complete search history.

(56) References Cited

U.S. PATENT DOCUMENTS

| | | | |
|---|---|---|---|
| 5,625,539 A * | 4/1997 | Nakata et al. | 363/17 |
| 5,682,305 A * | 10/1997 | Kurokami et al. | 363/79 |
| 6,297,616 B1 | 10/2001 | Kubo et al. | |
| 7,193,872 B2 * | 3/2007 | Siri | 363/95 |

(Continued)

FOREIGN PATENT DOCUMENTS

| JP | 11282553 A | 10/1999 |
|---|---|---|
| JP | 2001060123 | 3/2001 |
| KR | 20010006576 | 1/2001 |

OTHER PUBLICATIONS

Korean Office Action for Application No. 10-2010-0030538 mailed May 31, 2011.

*Primary Examiner* — Gary L Laxton
(74) *Attorney, Agent, or Firm* — Lowe Hauptman Ham & Berner, LLP

(57) ABSTRACT

Disclosed are a maximum power point tracker, a power conversion controller, a power conversion device having an insulating structure, and a method for tracking maximum power point. The power conversion device includes: a DC/AC converter including a primary DC chopper unit having a primary switch, a transformer, and an AC/AC conversion unit including a secondary switch; a current detector detecting current from an input stage of the DC/AC converter and providing a detected current value; a voltage detector detecting a system voltage from an output stage of the DC/AC converter; and a power conversion controller generating a primary PWM signal to be provided to the primary DC chopper unit and secondary first and second PWM signals, having the mutually opposing phases, to be provided to the AC/AC conversion unit by using the detected current value and the system voltage.

8 Claims, 10 Drawing Sheets

U.S. PATENT DOCUMENTS 7,465,872 B1* 12/2008 de Rooij et al. ............... 136/243
7,952,897 B2* 5/2011 Nocentini et al. .............. 363/41
2010/0236612 A1* 9/2010 Khajehoddin et al. ........ 136/252
2010/0309692 A1* 12/2010 Chisenga et al. ............... 363/37

* cited by examiner

US 8,422,258 B2

MAXIMUM POWER POINT TRACKER, POWER CONVERSION CONTROLLER, POWER CONVERSION DEVICE HAVING INSULATING STRUCTURE, AND METHOD FOR TRACKING MAXIMUM POWER POINT THEREOF

CROSS-REFERENCE TO RELATED APPLICATIONS

This application claims the priority of Korean Patent Application No. 10-2010-0030538 filed on Apr. 2, 2010, in the Korean Intellectual Property Office, the disclosure of which is incorporated herein by reference.

BACKGROUND OF THE INVENTION

1. Field of the Invention

The present invention relates to a maximum power point tracker that can be mounted in a solar cell module or is applicable to a module integrated converter (MIC), a power conversion device having an insulating structure, and a method for controlling a maximum power point, and more particularly, to a maximum power point tracker capable of performing a maximum power operation by using a current value in a DC/AC converter without having to detect a voltage value and being thus able to be fabricated at a low cost, a power conversion controller, a power conversion device having an insulating structure, and a method for tracking the maximum power point.

2. Description of the Related Art

In general, a solar power generation system may include a solar cell array including a plurality of solar cells connected in series or parallel to each other, and a power conversion device for a single solar generation system.

The power conversion device, operating the solar cell array such that the solar cell array generates an output at a maximum power point, converts a DC output of the solar cell array into an AC output and provides it to an electrical power system.

Here, even in the case that the solar cell modules are of the same model, they may have different output characteristics, and also, if the overall solar cell array is not irradiated with the uniform level of solar irradiation, the respective solar cell modules constituting the solar cell array would fail to generate maximum power they can, resulting in a reduction in an overall energy conversion efficiency of the solar generation system.

Thus, in order to solve the problem, the solar generation system may include a plurality of small capacity DC/DC converters mounted at the plurality of solar cell modules and a large capacity DC/AC power converter converting DC electricity from the plurality of small capacity DC/DC converters into AC electricity.

In this case, the small capacity DC/DC converters control the tracking of a maximum power point, respectively, to allow the plurality of solar cell modules to generate maximum power. Namely, the plurality of solar cells can be operated at a maximum power point, respectively.

In this case, such a solar generation system basically requires a voltage detector and a current detector for calculating power in order to track the maximum power point.

Also, in order to improve the shortcomings of the related art solar generation system, the solar generation system may include a plurality of DC/AC power converters mounted at the plurality of solar cell modules, respectively.

In such a system, power generated from the plurality of solar cell modules may be directly converted into system power so that the plurality of solar cell modules can operate at the maximum power point.

Then, in the foregoing solar generation system, because the plurality of solar cell modules operate at the maximum power point, respectively, and are directly associated with the commercial electric power system without using a large capacity DC/AC power machine, high-priced DC wiring is not necessary.

In this case, such a solar generation system basically requires a voltage detector and a current detector for calculating power in order to track the maximum power point.

However, in the related art solar generation system, if the quantity of solar energy irradiated to the solar cell array is not the same or when each solar cell module has different characteristics due to a problem in terms of fabrication, the solar cell modules cannot operate at the maximum power point.

In addition, the related art solar generation system requires a large number of sensors. Namely, if N number of solar cell modules are required to constitute the over solar generation system, a total of four sensors, two for an input side and the other two for an output side, would be required for each solar cell module, resulting in the situation that the number of sensors required for the overall solar generation system is 4*N. Thus, because a large amount of sensors are required, the fabrication cost increases.

SUMMARY OF THE INVENTION

An aspect of the present invention provides a maximum power point tracker capable of performing a maximum power operation by using a current value in a DC/AC converter without having to detect a voltage value and thus being fabricated at a lower cost, a power conversion controller, a power conversion device having an insulating structure, and a method for tracking a maximum power point.

According to an aspect of the present invention, there is provided a maximum power point tracker applied to a DC/AC converter including a primary DC chopper unit having a primary switch, a transformer, and an AC/AC conversion unit including a secondary switch, including: a first multiplier multiplying a detected current value obtained from an input stage of the DC/AC converter and a previously calculated OFF time to obtain an infinitesimal energy variation; a power calculation unit obtaining a power variation by using the infinitesimal energy variation from the first multiplier and obtaining a current variation by using the detected current value; a current command value setting unit setting a current command value to allow power to track a maximum power point through the input stage of the DC/AC converter by using the power variation and the current variation; and an OFF time calculation unit calculating an OFF time of the primary switch according to a control signal generated based on the current command value and a carrier signal.

The power calculation unit may include: a first calculation unit integrating the infinitesimal energy variation from the first multiplier during one period of a system voltage to obtain an energy variation; a second calculation unit subtracting a previous energy variation from the energy variation to obtain a power variation; and a third calculation unit subtracting a previously detected current value from the detected current value to obtain a current variation.

The current command value setting unit may include: a first setting unit setting the current command value by subtracting a pre-set step current variation from the current command value when the power variation is smaller than a power reference value and the current variation is greater than or the same as a pre-set current reference value; a second setting unit setting the current command value by adding the pre-set step current variation to the current command value when the power variation is smaller than the power reference value and the current variation is smaller than the pre-set current reference value; a third setting unit setting the current command value by adding the pre-set step current variation to the current command value when the power variation is greater than or the same as the power reference value and the current variation is greater than or the same as the pre-set current reference value; and a fourth setting unit setting the current command value by subtracting the pre-set step current variation from the current command value when the power variation is greater than or the same as the power reference value and the current variation is smaller than the pre-set current reference value.

According to another aspect of the present invention, there is provided a power conversion controller for controlling a DC/AC converter including a primary DC chopper unit having a primary switch, a transformer, and an AC/AC conversion unit including a secondary switch, including: a maximum power point tracker setting a current command value to allow power to track a maximum power point through an input stage of the DC/AC converter by using a detected current value obtained from the input stage of the DC/AC converter; a first pulse width modulation (PWM) controller generating a primary PWM signal for switching the primary switch by using a current command value from the maximum power point tracker and a pre-set carrier signal; a phase detector detecting the phase of a system voltage detected from an output stage of the DC/AC converter to provide phase information; and a second PWM controller generating secondary first and second PWM signals having the mutually opposing phases (e.g., anti-phase or out-of phase) by using the phase information from the phase detector.

The maximum power point tracker may include: a first multiplier multiplying a detected current value obtained from the input stage of the DC/AC converter and a previously calculated OFF time to obtain an infinitesimal energy variation; a power calculation unit obtaining a power variation by using the infinitesimal energy variation from the first multiplier and obtaining a current variation by using the detected current value; a current command value setting unit setting a current command value to allow power to track a maximum power point through the input stage of the DC/AC converter by using the power variation and the current variation; and an OFF time calculation unit calculating an OFF time of the primary switch according to a control signal generated based on the current command value and a carrier signal.

The power calculation unit may include: a first calculation unit integrating the infinitesimal energy variation from the first multiplier during one period of a system voltage to obtain an energy variation; a second calculation unit subtracting a previous energy variation from the energy variation to obtain a power variation; and a third calculation unit subtracting a previously detected current value from the detected current value to obtain a current variation.

The current command value setting unit may include: a first setting unit setting the current command value by subtracting a pre-set step current variation from the current command value when the power variation is smaller than a power reference value and the current variation is greater than or the same as a pre-set current reference value; a second setting unit setting the current command value by adding the pre-set step current variation to the current command value when the power variation is smaller than the power reference value and the current variation is smaller than the pre-set current reference value; a third setting unit setting the current command value by adding the pre-set step current variation to the current command value when the power variation is greater than or the same as the power reference value and the current variation is greater than or the same as the pre-set current reference value; and a fourth setting unit setting the current command value by subtracting the pre-set step current variation from the current command value when the power variation is greater than or the same as the power reference value and the current variation is smaller than the pre-set current reference value.

The first PWM controller may include: a compensation controller compensating a control value by using the difference between the current command value and the detected current value from the maximum power point tracker; a second multiplier multiplying the control value from the compensation controller and a phase signal from the second PWM controller to generate a control signal; and a first PWM generation unit generating a primary PWM signal for switching the primary switch by using the control signal from the second multiplier and a pre-set carrier signal.

The second PWM controller may include: a phase signal generation unit generating a phase signal by using the phase information from the phase detector and providing the generated phase signal to the first PWM controller; and a second PWM generation unit generating secondary first and second PWM signals having the mutually opposing phases by using the phase information from the phase detector.

According to another aspect of the present invention, there is provided a power conversion device including: a DC/AC converter including a primary DC chopper unit having a primary switch, a transformer, and an AC/AC conversion unit including a secondary switch; a current detector detecting current from an input stage of the DC/AC converter and providing a detected current value; a voltage detector detecting a system voltage from an output stage of the DC/AC converter; and a power conversion controller generating a primary pulse width modulation (PWM) signal to be provided to the primary DC chopper unit and secondary first and second PWM signals, having the mutually opposing phases, to be provided to the AC/AC conversion unit by using the detected current value and the system voltage.

The DC/AC converter may include: the primary DC chopper unit having the primary switch; the transformer having a primary coil connected between the primary switch and the input stage and a secondary coil; and the AC/AC conversion unit including a secondary first switch connected to one end of the secondary coil and a secondary second switch connected to the other end of the secondary coil.

The AC/AC conversion unit may include: a secondary switching circuit unit including a secondary first switch connected to one end of the secondary coil, a first diode connected in a forward direction to the secondary first switch, a secondary second switch connected to the other end of the secondary coil, and a second diode connected in a reverse direction to the secondary second switch; and a filter including a first capacitor and a first inductor in order to convert an output signal from the secondary switching circuit unit into a sinusoidal AC signal.

The power conversion controller may include: a maximum power point tracker setting a current command value to allow power to track a maximum power point through an input stage of the DC/AC converter by using a detected current value obtained from the input stage of the DC/AC converter; a first PWM controller generating a primary PWM signal for switching the primary switch by using a current command value from the maximum power point tracker and a pre-set carrier signal; a phase detector detecting the phase of a system voltage detected from the output stage of the DC/AC converter to provide phase information; and a second PWM controller generating secondary first and second PWM signals having the mutually opposing phases (e.g., anti-phase or out-of phase) by using the phase information from the phase detector.

The maximum power point tracker may include: a first multiplier multiplying a detected current value obtained from the input stage of the DC/AC converter and a previously calculated OFF time to obtain an infinitesimal energy variation; a power calculation unit obtaining a power variation by using the infinitesimal energy variation from the first multiplier and obtaining a current variation by using the detected current value; a current command value setting unit setting a current command value to allow power to track a maximum power point through the input stage of the DC/AC converter by using the power variation and the current variation; and an OFF time calculation unit calculating an OFF time of the primary switch according to a control signal generated based on the current command value and a carrier signal.

The power calculation unit may include: a first calculation unit integrating the infinitesimal energy variation from the first multiplier during one period of a system voltage to obtain an energy variation; a second calculation unit subtracting a previous energy variation from the energy variation to obtain a power variation; and a third calculation unit subtracting a previously detected current value from the detected current value to obtain a current variation.

The current command value setting unit may include: a first setting unit setting the current command value by subtracting a pre-set step current variation from the current command value when the power variation is smaller than a power reference value and the current variation is greater than or the same as a pre-set current reference value; a second setting unit setting the current command value by adding the pre-set step current variation to the current command value when the power variation is smaller than the power reference value and the current variation is smaller than the pre-set current reference value; a third setting unit setting the current command value by adding the pre-set step current variation to the current command value when the power variation is greater than or the same as the power reference value and the current variation is greater than or the same as the pre-set current reference value; and a fourth setting unit setting the current command value by subtracting the pre-set step current variation from the current command value when the power variation is greater than or the same as the power reference value and the current variation is smaller than the pre-set current reference value.

The first PWM controller may include: a compensation controller compensating a control value by using the difference between the current command value and the detected current value from the maximum power point tracker; a second multiplier multiplying the control value from the compensation controller and a phase signal from the second PWM controller to generate a control signal; and a first PWM generation unit generating a primary PWM signal for switching the primary switch by using the control signal from the second multiplier and a pre-set carrier signal.

According to another aspect of the present invention, there is provided a method for tracking a maximum power point applied to a power conversion device having an insulating structure including a DC/AC converter including a primary DC chopper unit having a primary switch, a transformer, and an AC/AC conversion unit including a secondary switch, including: an OFF time calculation operation of calculating an OFF time of the primary switch by using a control signal generated based on a current command value and a carrier signal; an energy calculation operation of obtaining an infinitesimal energy variation by multiplying a detected current value obtained from an input stage of the DC/AC converter and the OFF time; a power calculation operation of obtaining a power variation by using the infinitesimal energy variation and obtaining a current variation by using the detected current value; and a current command value setting operation of setting a current command value to allow power to track a maximum power point through the input stage of the DC/AC converter by using the power variation and the current variation.

The power calculation operation may include: a first calculation operation of obtaining an energy variation by integrating the infinitesimal energy variation during one period of a system voltage; a second calculation operation of obtaining a power variation by subtracting a previous energy variation from the energy variation; and a third calculation operation of obtaining a current variation by subtracting a previously detected current value from the detected current value.

The current command value setting operation may include: a determination operation of determining the size of the power variation and the current variation with respect to a pre-set power reference value and a pre-set current reference value; and a setting operation of setting the current command value by arithmetically operating the detected current value and a pre-set variation according to the determination result of the determination operation.

The determination operation may include: a first determination operation of determining whether or not the power variation is greater than or the same as the pre-set power reference value; a second determination operation of determining whether or not the current variation is greater than or the same as the pre-set current reference value when the power variation is greater than or the same as the pre-set power reference value; and a third determination operation of determining whether or not the current variation is greater than the pre-set current reference value when the power variation is smaller than the pre-set power reference value.

The setting operation may include: a first setting operation of setting the current command value by subtracting a pre-set step current variation from the current command value when the power variation is smaller than a power reference value and the current variation is greater than or the same as a pre-set current reference value; a second setting operation of setting the current command value by adding the pre-set step current variation to the current command value when the power variation is smaller than the power reference value and the current variation is smaller than the pre-set current reference value; a third setting operation of setting the current command value by adding the pre-set step current variation to the current command value when the power variation is greater than or the same as the power reference value and the current variation is greater than or the same as the pre-set current reference value; and a fourth setting operation of setting the current command value by subtracting the pre-set step current variation from the current command value when the power variation is greater than or the same as the power reference value and the current variation is smaller than the pre-set current reference value.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
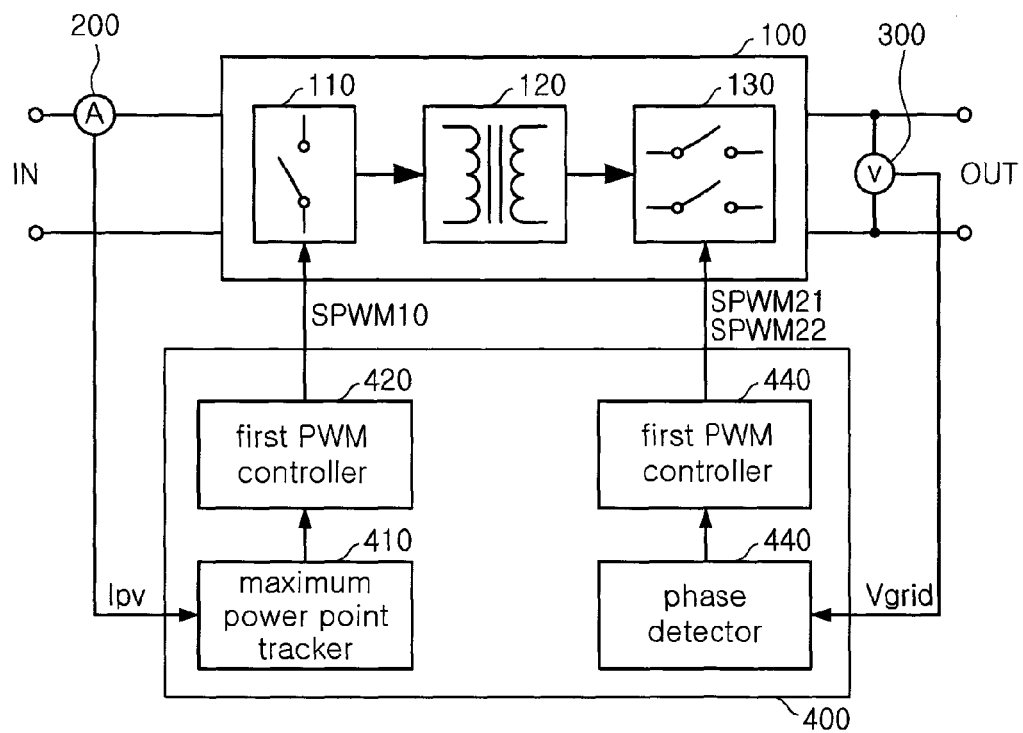
FIG. 1 is a schematic block diagram of a power conversion device having an insulating structure according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a schematic block diagram of a power conversion device having an insulating structure according to an exemplary embodiment of the present invention.

With reference to FIG. 1, a power conversion device having an insulating structure according to an exemplary embodiment of the present invention may include a DC/AC converter 100 including a primary DC chopper unit 110 having a primary switch, a transformer 120, and an AC/AC conversion unit 130 including a secondary switch, a current detector 200 detecting current from an input stage of the DC/AC converter 100 and providing a detected current value Ipv, a voltage detector 300 detecting a system voltage Vgrid from an output stage of the DC/AC converter 100, and a power conversion controller 400 generating a primary pulse width modulation (PWM) signal SPWM10 to be provided to the primary DC chopper unit 110 and secondary first and second PWM signals SPWM21 and SPWM22, having the mutually opposing phases, to be provided to the AC/AC conversion unit 130 by using the detected current value Ipv and the system voltage Vgrid.

Figure 2:
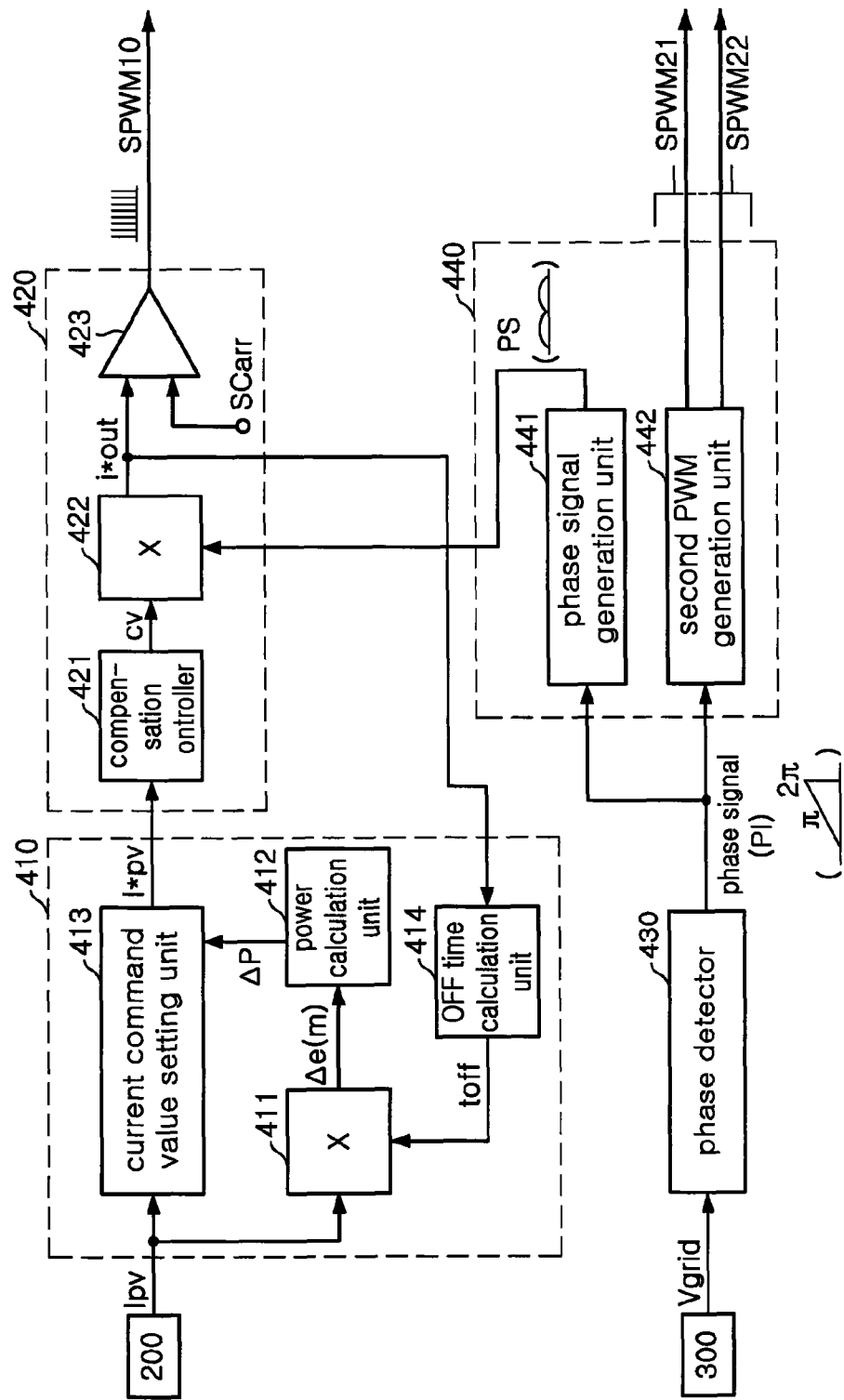
FIG. 2 is a schematic block diagram of a power conversion controller according to an exemplary embodiment of the present invention.

FIG. 2 is a schematic block diagram of the power conversion controller according to an exemplary embodiment of the present invention.

With reference to FIG. 2, the power conversion controller 400 may include a maximum power point tracker 410 setting a current command value I*pv to allow for the tracking of a maximum power point of power flowing through the input stage of the DC/AC converter 100 by using the detected current value Ipv obtained from the input stage of the DC/AC converter, a first pulse width modulation (PWM) controller 420 generating the primary PWM signal SPWM10 for switching the primary switch by using a current command value I*pv from the maximum power point tracker 410 and a pre-set carrier signal SCarr, a phase detector 430 detecting the phase of a system voltage Vgrid detected from an output stage of the DC/AC converter 100 to provide phase information PI, and a second PWM controller 440 generating secondary first and second PWM signals SPWM21 and SPWM22 having the mutually opposing phases by using the phase information PI from the phase detector 430.

The maximum power point tracker 410 may include a first multiplier 411 multiplying the detected current value Ipv obtained from the input stage of the DC/AC converter 100 and a previously calculated OFF time toff to obtain an infinitesimal energy variation $\Delta e(m)$, a power calculation unit 412 obtaining a power variation $\Delta P$ by using the infinitesimal energy variation $\Delta e(m)$ from the first multiplier 411 and obtaining a current variation $\Delta I$ by using the detected current value Ipv; a current command value setting unit 413 setting the current command value I*pv to allow power to track a maximum power point through the input stage of the DC/AC converter 100 by using the power variation $\Delta P$ and the current variation $\Delta I$, and an OFF time calculation unit 414 calculating an OFF time toff of the primary switch according to a control signal i*out generated based on the current command value I*pv and the carrier signal SCarr.

Figure 3:
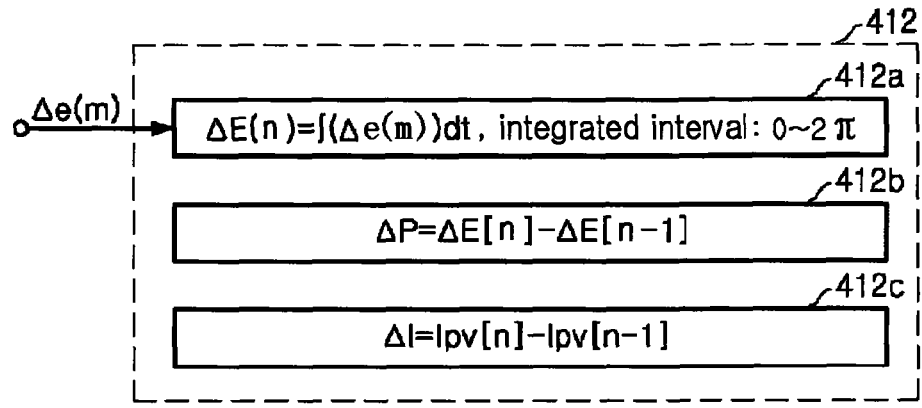
FIG. 3 is a schematic block diagram of a power calculation unit according to an exemplary embodiment of the present invention.

FIG. 3 is a schematic block diagram of the power calculation unit according to an exemplary embodiment of the present invention.

With reference to FIG. 3, the power calculation unit may include a first calculation unit 412a integrating the infinitesimal energy variation $\Delta e(m)$ from the first multiplier 411 during one period ($t=0\sim2\pi$) of a system voltage to obtain an energy variation $\Delta E(n)$, a second calculation unit 412b subtracting a previous energy variation $\Delta E(n-1)$ from the energy variation $\Delta E(n)$ to obtain the power variation $\Delta P$, and a third calculation unit 412c subtracting a previously detected current value Ipv[n−1] from the detected current value Ipv[n] to obtain a current variation $\Delta I$.

Figure 4:
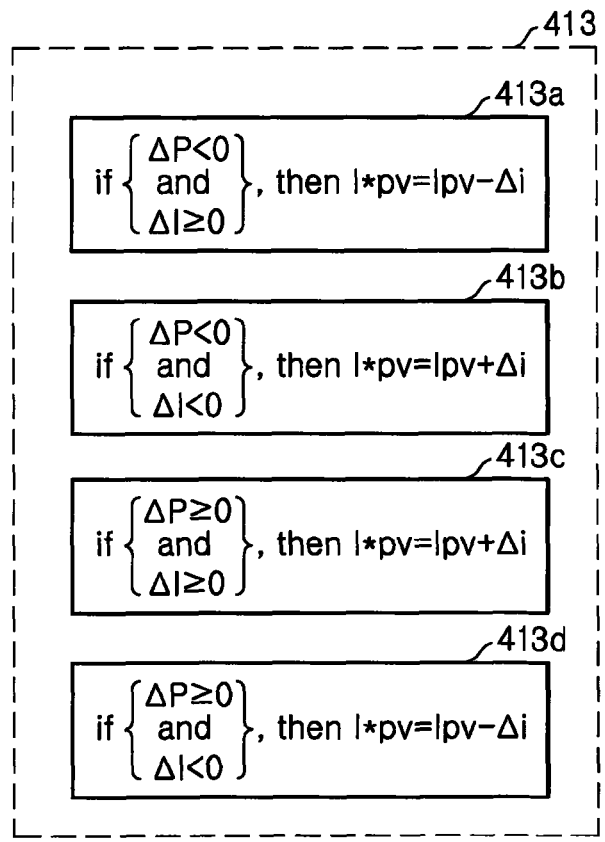
FIG. 4 is a schematic block diagram of a current command value setting unit according to an exemplary embodiment of the present invention.

FIG. 4 is a schematic block diagram of the current command value setting unit according to an exemplary embodiment of the present invention.

With reference to FIG. 4, the current command value setting unit 413 may include a first setting unit 413a setting the current command value I*pv by subtracting a pre-set step current variation $\Delta i$ from the current command value I*pv when the power variation $\Delta P$ is smaller than a power reference value and the current variation $\Delta I$ is greater than or the same as a pre-set current reference value, a second setting unit 413b setting the current command value I*pv by adding the pre-set step current variation Δi to the current command value I*pv when the power variation ΔP is smaller than the power reference value and the current variation ΔI is smaller than the pre-set current reference value, a third setting unit 413c setting the current command value I*pv by adding the pre-set step current variation Δi to the current command value I*pv when the power variation ΔP is greater than or the same as the power reference value and the current variation ΔI is greater than or the same as the pre-set current reference value, and a fourth setting unit 413d setting the current command value I*pv by subtracting the pre-set step current variation Δi from the current command value I*pv when the power variation ΔP is greater than or the same as the power reference value and the current variation ΔI is smaller than the pre-set current reference value.

Figure 5:
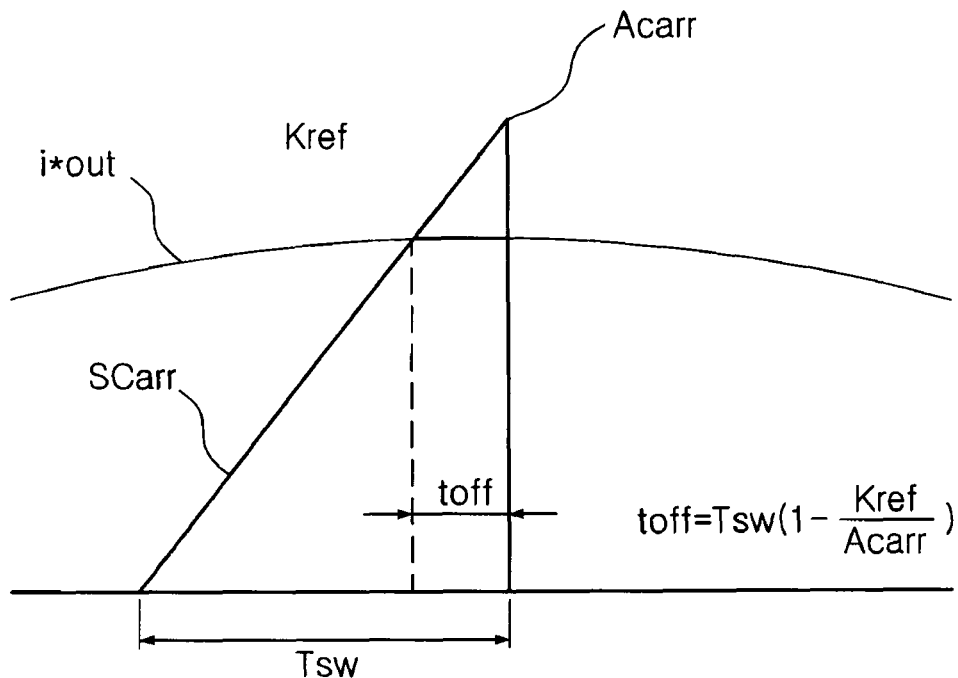
FIG. 5 is a view for explaining an operational concept of an OFF time calculation unit according to an exemplary embodiment of the present invention.

FIG. 5 is a view for explaining an operational concept of the OFF time calculation unit according to an exemplary embodiment of the present invention.

With reference to FIG. 5, the OFF time calculation unit 414 may calculate the OFF time toff of the primary switch by using an instantaneous size $k_{ref}$ of the control signal i*out, an instantaneous maximum size Acarr of the pre-set carrier signal SCarr, and a period Tsw of the carrier signal.

The first PWM controller 420 may include a compensation controller 421 compensating a control value by using the difference between the current command value I*pv and the detected current value Ipv from the maximum power point tracker 410, a second multiplier 422 multiplying the control value CV from the compensation controller 421 and a phase signal from the second PWM controller 440 to generate a control signal i*out, and a first PWM generation unit 423 generating the primary PWM signal SPWM10 for switching the primary switch by using the control signal i*out from the second multiplier 422 and the pre-set carrier signal SCarr.

Figure 6:
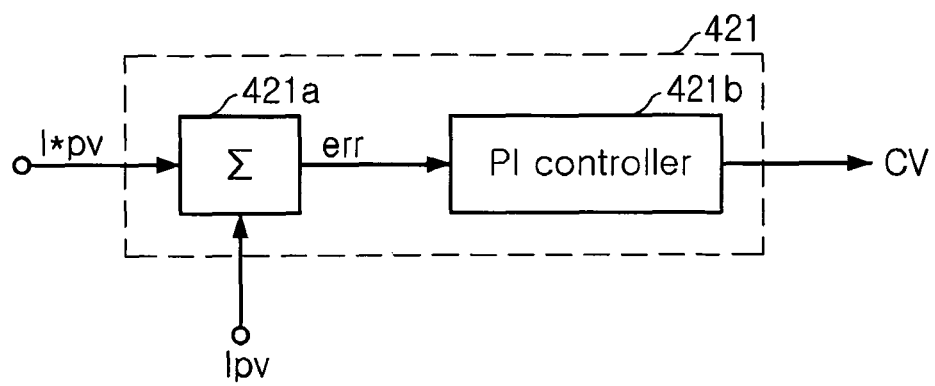
FIG. 6 shows an example of implementation of a compensation controller according to an exemplary embodiment of the present invention.

FIG. 6 shows an example of implementation of the compensation controller according to an exemplary embodiment of the present invention.

With reference to FIG. 6, the compensation controller 421 may include an error amplifier 421a obtaining the difference between the current command value I*pv from the maximum power point tracker 410 and the detected current value Ipv, and an error compensator 421b compensating for the control value by using the difference from the error amplifier 421a. Here, as the error compensator 421b, a proportional integration PI controller may be employed.

Figure 7:
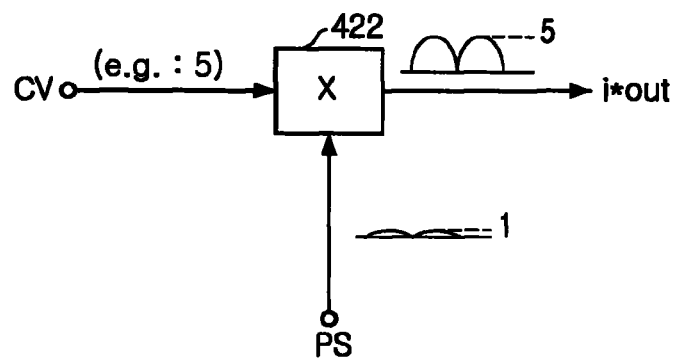
FIG. 7 is a view for explaining the operation of a second multiplier according to an exemplary embodiment of the present invention.

FIG. 7 is a view for explaining the operation of the second multiplier according to an exemplary embodiment of the present invention.

With reference to FIG. 7, the second multiplier 422 generates the control signal i*out in which a peak value of a phase signal from the second PWM controller 440 is as large as the size of the control value CV from the compensation controller 421.

Figure 8:
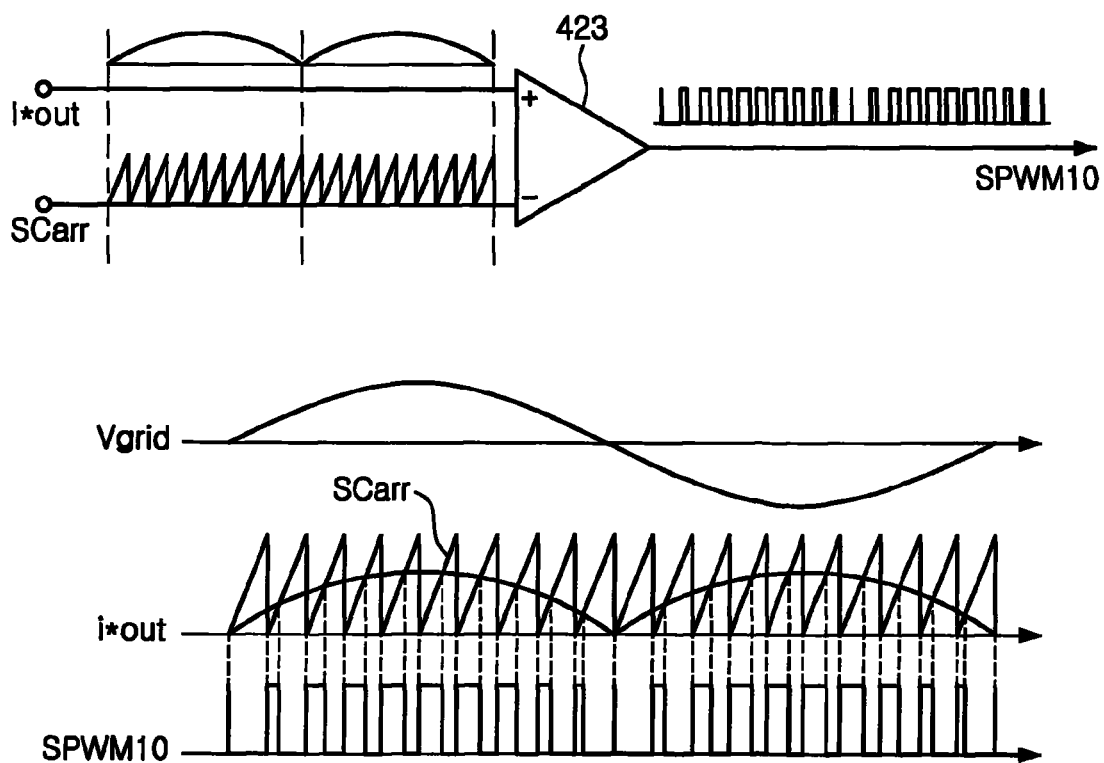
FIG. 8 shows an example of implementation of a first pulse width modulation (PWM) generation unit according to an exemplary embodiment of the present invention.

FIG. 8 shows an example of implementation of the first pulse width modulation (PWM) generation unit according to an exemplary embodiment of the present invention.

With reference to FIG. 8, the first PWM generation unit 423 may include a non-inverting input stage receiving the control signal i*out from the second multiplier 422, an inverting input terminal receiving the pre-set carrier signal SCarr, and a comparator generating the primary PWM signal SPWM10 having a pulse when the control signal i*out from the second multiplier 422 is greater than the pre-set carrier signal SCarr.

The second PWM controller 440 may include a phase signal generation unit 441 generating the phase signal PS by using the phase information (PI) of the phase detector 430 and providing the generated phase signal PS to the first PWM controller 420, and a second PWM generation unit 442 generating secondary first and second PWM signals SPWM21 and SPWM22, having the mutually opposing phases, by using the phase information PI from the phase detector 430.

Figure 9:
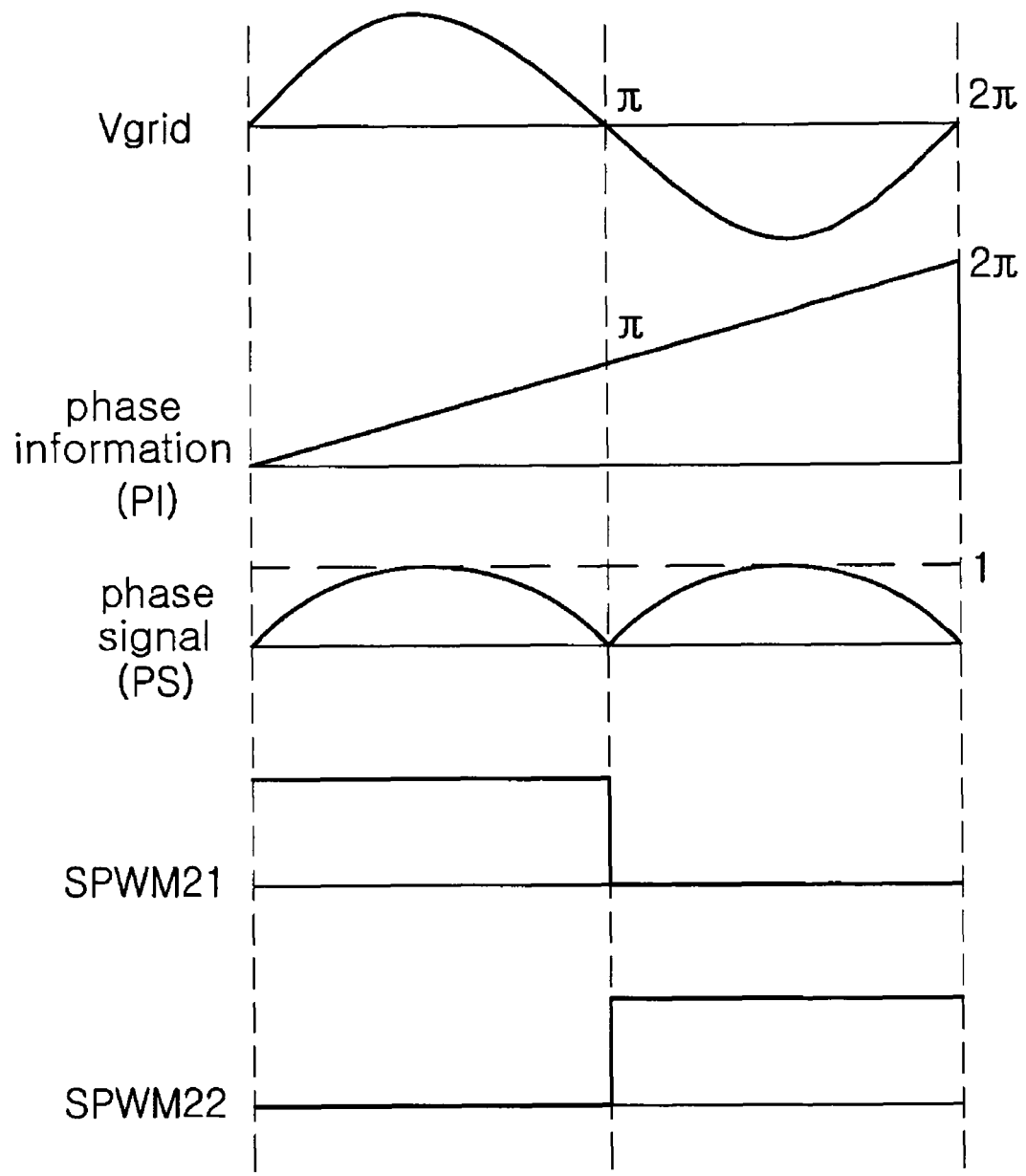
FIG. 9 is a timing chart of major signals of a phase detector and a second PWM controller according to an exemplary embodiment of the present invention.

FIG. 9 is a timing chart of major signals of the phase detector and the second PWM controller according to an exemplary embodiment of the present invention. In FIG. 9, Vgrid is a system voltage having a commercial cycle, the PI is phase information of the system voltage Vgrid, and the PS is a phase signal having a positive (+) unit size by using the phase information PI. SPWM21, synchronized with the system voltage, is a first PWM signal having a positive (+) pulse when the system voltage has a positive (+) value, and SPWM 22, synchronized with the phase of the system voltage, is a second PWM signal, having a positive (+) pulse when the system voltage has a negative (−) value.

Figure 10:
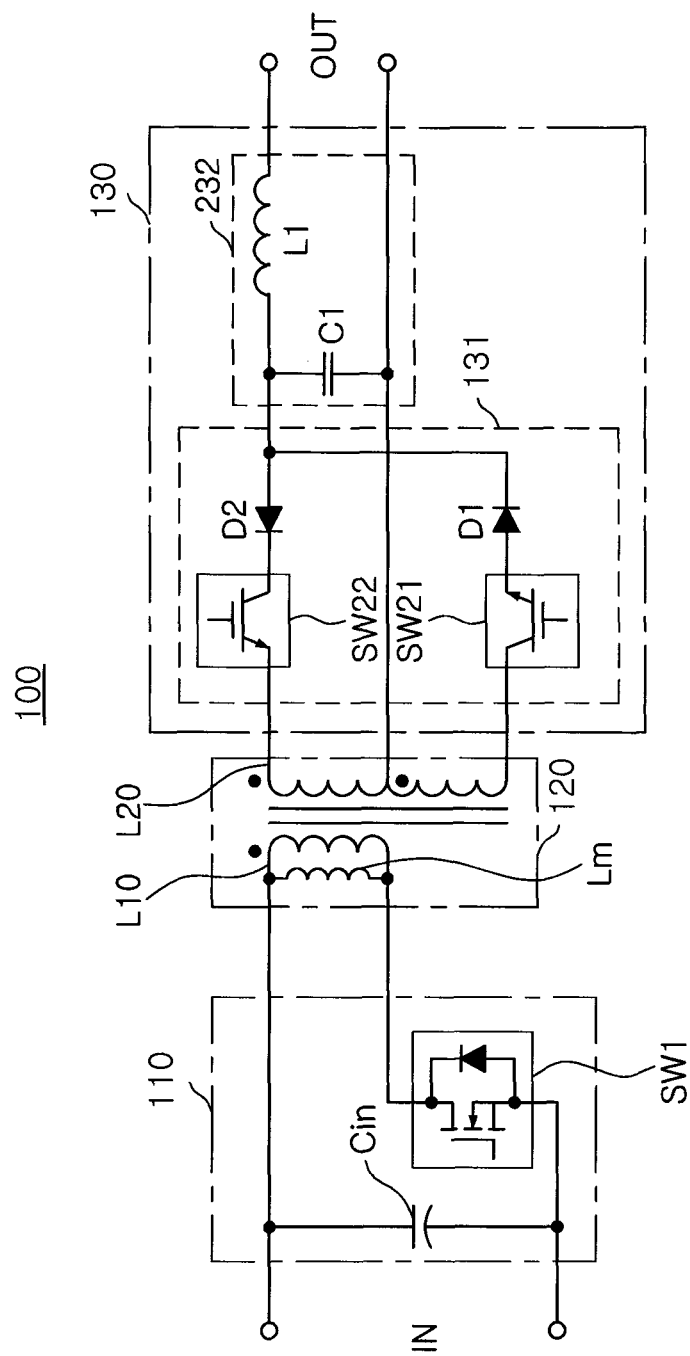
FIG. 10 is a circuit diagram of a DC/AC converter according to an exemplary embodiment of the present invention.

FIG. 10 is a circuit diagram of the DC/AC converter according to an exemplary embodiment of the present invention.

With reference to FIG. 10, the DC/AC converter may include the primary DC chopper unit 110 having the primary switch SW10, the transformer 120 having a primary coil L10 connected between the primary switch SW10 and the input stage (IN) and a secondary coil L20, and the AC/AC conversion unit 130 including a secondary first switch SW21 connected to one end of the secondary coil L20 and a secondary second switch SW22 connected to the other end of the secondary coil L20.

In addition, the primary DC chopper unit 110 may include an input capacitor Cin connected to a zero stage of the input stage IN.

The AC/AC conversion unit 130 may include a secondary switching circuit unit 131 including the secondary first switch connected to one end of the secondary coil L20, a first diode D1 connected in a forward direction to the secondary first switch S21, the secondary second switch SW22 connected to the other end of the secondary coil L20, and a second diode D2 connected in a reverse direction to the secondary second switch SW22. The AC/AC conversion unit 130 may also include a filter 132 including a first capacitor C1 and a first inductor L1 in order to convert an output signal from the secondary switching circuit unit 131 into a sinusoidal AC signal.

FIGS. 11a to 11d are views for explaining the operation of the DC/AC converter according to an exemplary embodiment of the present invention.

Figure 11A:
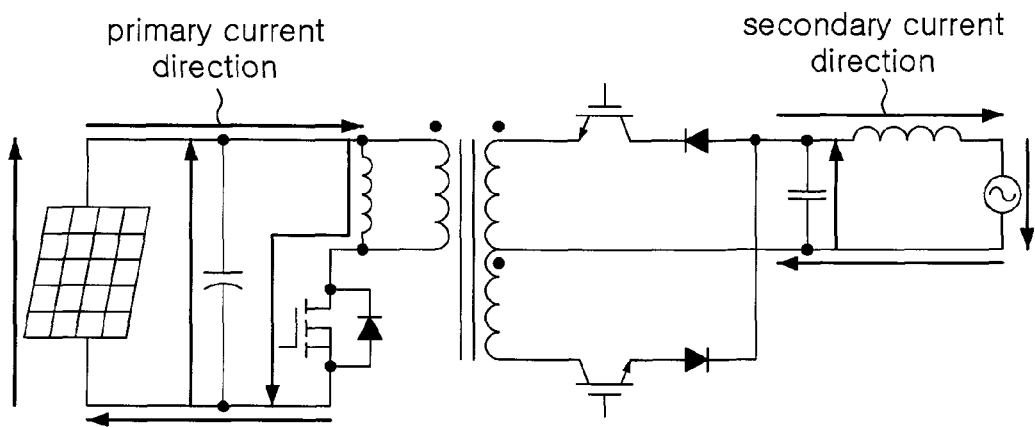
FIGS. 11a to 11d are views for explaining the operation of the DC/AC converter according to an exemplary embodiment of the present invention.
Figure 11B:
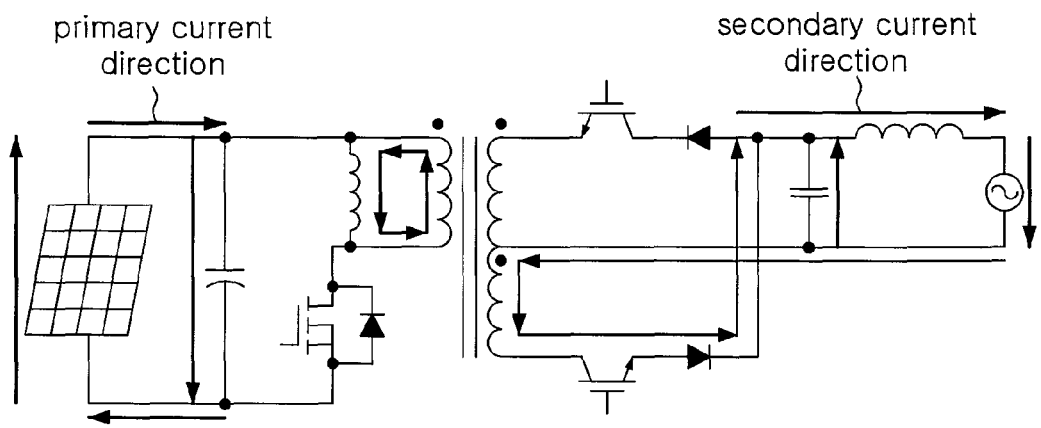

Specifically, FIGS. 11a and 11b show operational states according to the first PWM signal SPWM21 having the positive (+) pulse when the system voltage Vgrid has a positive (+) phase, wherein FIG. 11a shows an operation when the primary switch SW10 is in an ON state, and FIG. 11b shows an operation when the primary switch SW10 is in an OFF state.

Figure 11C:
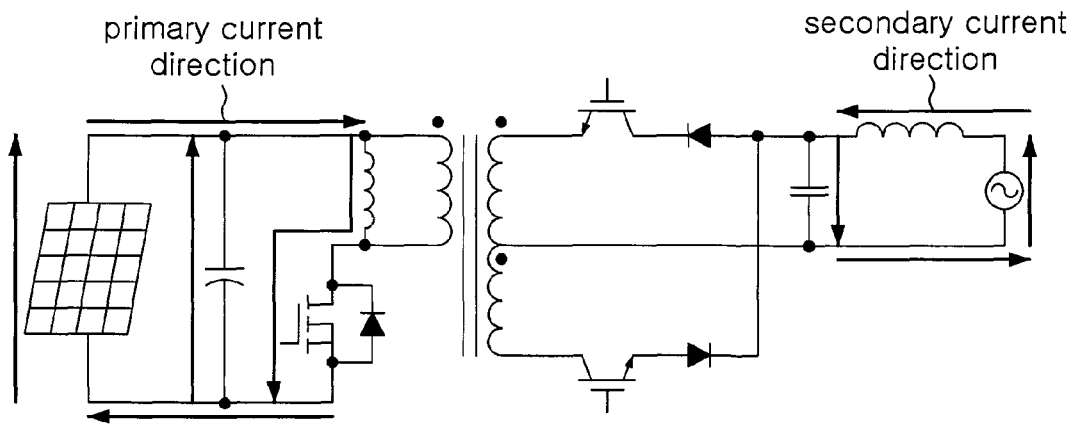
Figure 11D:
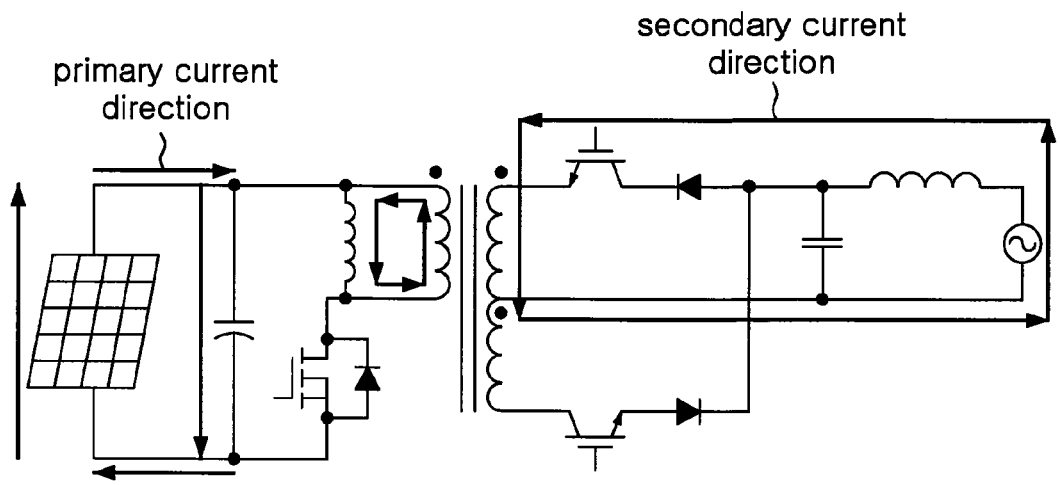

FIGS. 11c and 11d show operational states according to the second PWM signal SPWM22 having the positive (+) pulse when the system voltage Vgrid has a negative (−) phase, wherein FIG. 11c shows an operation when the primary switch SW10 is in an ON state, and FIG. 11d shows an operation when the primary switch SW10 is in an OFF state.

Figure 12:
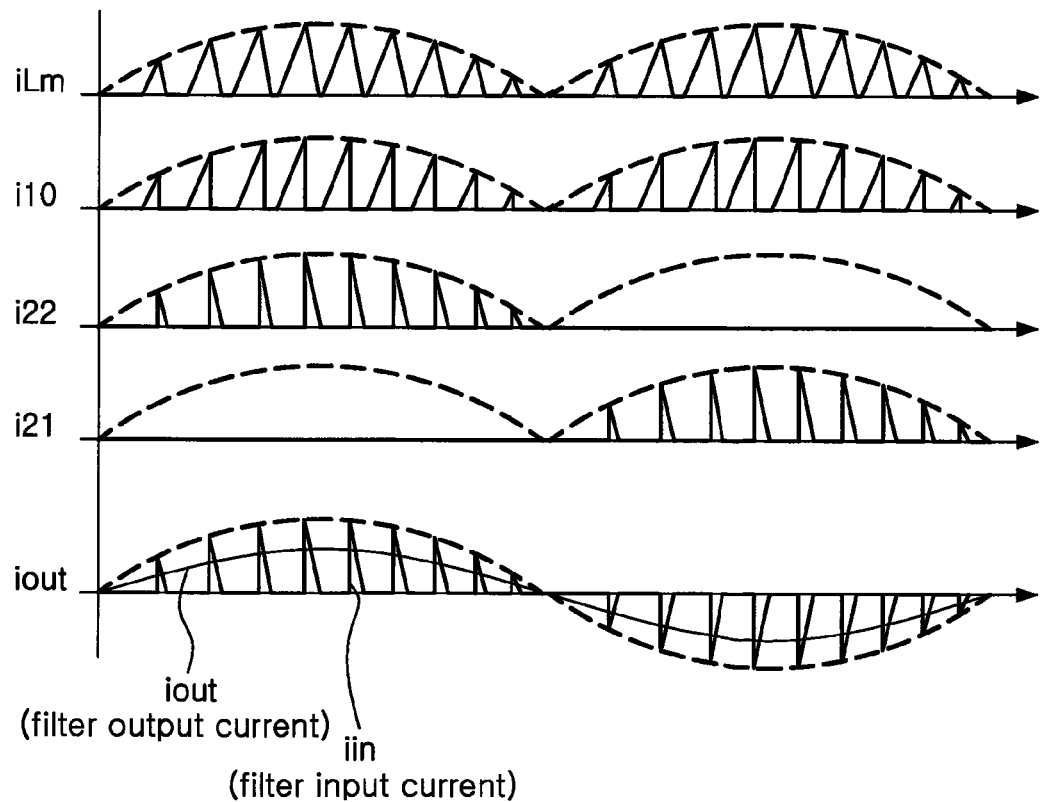
FIG. 12 is a timing chart of major currents of the DC/AC converter according to an exemplary embodiment of the present invention.

FIG. 12 is a timing chart of major currents of the DC/AC converter according to an exemplary embodiment of the present invention.

In FIG. 12, iLm is current flowing across a primary magnetized inductor Lm of the transformer, i10 is current flowing across the primary switch SW10, i21 is current flowing across the secondary first switch SW21, and i22 is current flowing across the secondary second switch SW22.

Figure 13:
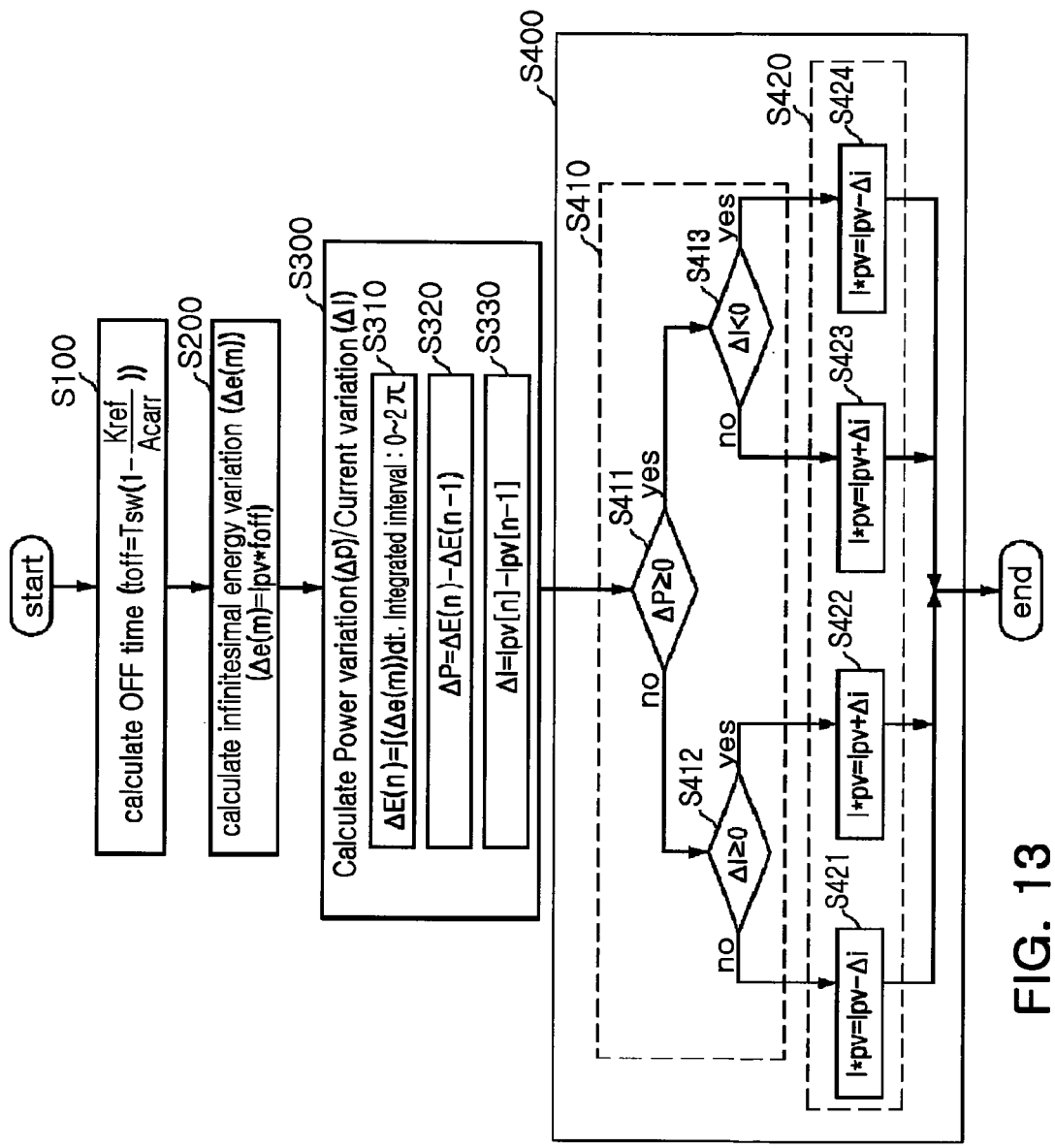
FIG. 13 is a flow chart illustrating the process of a method for tracking a maximum power point applied to a power conversion device having an insulating structure according to an exemplary embodiment of the present invention.

FIG. 13 is a flow chart illustrating the process of a method for tracking a maximum power point applied to a power conversion device having an insulating structure according to an exemplary embodiment of the present invention.

With reference to FIG. 13, the method for tracking a maximum power point is applied to the power conversion device having an insulating structure including the DC/AC converter 100 including the primary DC chopper unit 110 having the primary switch, the transformer 120, and the AC/AC conversion unit 130 including a secondary switch. The method for tracking a maximum power point may include an OFF time calculation step (S100) of calculating an OFF time toff of the primary switch by using a control signal i*out generated based on a current command value I*pv and a carrier signal (SCarr), an energy calculation step (S200) of obtaining an infinitesimal energy variation $\Delta e(m)$ by multiplying a detected current value Ipv obtained from an input stage of the DC/AC converter 100 and the OFF time toff, a power calculation step (S300) of obtaining a power variation $\Delta P$ by using the infinitesimal energy variation $\Delta e(m)$ and obtaining a current variation $\Delta I$ by using the detected current value Ipv, and a current command value setting step (S400) of setting a current command value I*pv to allow power to track a maximum power point through the input stage of the DC/AC converter by using the power variation $\Delta P$ and the current variation $\Delta I$.

The power calculation step (S300) may include a first calculation step (S310) of obtaining an energy variation $\Delta E(n)$ by integrating the infinitesimal energy variation $\Delta e(m)$ during one period (0~2π) of a system voltage, a second calculation step (S320) of obtaining a power variation $\Delta P$ by subtracting a previous energy variation $\Delta E(n-1)$ from the energy variation $\Delta E(n)$, and a third calculation step (S330) of obtaining a current variation ($\Delta I$) by subtracting a previously detected current value Ipv[n-1] from the detected current value Ipv[n].

The current command value setting step (S400) may include a determination step (S410) of determining the sizes of the power variation $\Delta P$ and the current variation $\Delta I$ with respect to a pre-set power reference value and a pre-set current reference value, and a setting step (S420) of setting the current command value I*pv by arithmetically operating the detected current value Ipv and a pre-set variation $\Delta i$ according to the determination result in the determination step (S410).

The determination step (S410) may include a first determination step (S411) of determining whether or not the power variation $\Delta P$ is greater than or the same as the pre-set power reference value, a second determination step (S412) of determining whether or not the current variation ($\Delta I$) is greater than or the same as the pre-set current reference value when the power variation $\Delta P$ is greater than or the same as the pre-set power reference value, and a third determination step (S413) of determining whether or not the current variation $\Delta I$ is greater than the pre-set current reference value when the power variation $\Delta P$ is smaller than the pre-set power reference value.

The setting step (S420) may include a first setting step (S421) of setting the current command value I*pv by subtracting a pre-set step current variation $\Delta i$ from the current command value I*pv when the power variation $\Delta P$ is smaller than a power reference value and the current variation $\Delta I$ is greater than or the same as a pre-set current reference value, a second setting step (S422) of setting the current command value I*pv by adding the pre-set step current variation $\Delta i$ to the current command value I*pv when the power variation $\Delta P$ is smaller than the power reference value and the current variation $\Delta I$ is smaller than the pre-set current reference value, a third setting step (S423) of setting the current command value I*pv by adding the pre-set step current variation $\Delta i$ to the current command value I*pv when the power variation $\Delta P$ is greater than or the same as the power reference value and the current variation $\Delta I$ is greater than or the same as the pre-set current reference value, and a fourth setting step (S424) of setting the current command value I*pv by subtracting the pre-set step current variation $\Delta i$ from the current command value when the power variation $\Delta P$ is greater than or the same as the power reference value and the current variation $\Delta I$ is smaller than the pre-set current reference value.

The operation and effect of the present invention will be described with reference to the accompanying drawings as follows.

The power conversion device having an insulating structure according to an exemplary embodiment of the present invention will now be described with reference to FIGS. 1 to 12. In FIG. 1, the DC/AC converter 100 of the power conversion device according to an exemplary embodiment of the present invention includes the primary DC chopper unit 110, the transformer 120, and the AC/AC conversion unit 130. An example of implementation of the DC/AC converter 100 will be described with reference to FIG. 7.

First, as shown in FIG. 1, the current detector 200 of the power conversion device according to an exemplary embodiment of the present invention detects current at the input stage of the DC/AC converter 100 and provides the detected current value Ipv. The voltage detector 300 of the power conversion device according to an exemplary embodiment of the present invention detects the system voltage Vgrid at the output stage of the DC/AC converter 100.

The power conversion controller 400 of the power conversion device according to an exemplary embodiment of the present invention generates the primary PWM signal SPWM10 to be provided to the primary DC chopper unit 110 and the secondary first and second PWM signals SPWM21 and SPWM22, having the mutually opposing phases, to be provided to the AC/AC conversion unit 130 by using the detected current value Ipv and the system voltage Vgrid.

The power conversion controller 400 will now be described with reference to FIG. 2.

As shown in FIG. 2, the maximum power point tracker 410 of the power conversion controller 400 sets the current command value I*pv to allow power to track the maximum power point through the input stage of the DC/AC converter 100 by using the detected current value Ipv obtained from the input stage of the DC/AC converter 100, and provides the set current command value I*pv to the first PWM controller 420.

Then, the first PWM controller 420 generates the primary PWM signal SPWM10 for switching the primary switch by using the current command value I*pv from the maximum power point tracker 410 and the pre-set carrier signal SCarr.

The phase detector 430 of the power conversion controller 400 detects the phase of the system voltage Vgrid detected at the output stage of the DC/AC converter 100 and provides the phase information PI to the second PWM controller 440.

Then, the second PWM controller 440 may generate the secondary first and second PWM signals SPWM21 and SPWM22, having the mutually opposing phases, by using the phase information PI from the phase detector 430.

The maximum power point tracker 410 will now be described with reference to FIG. 2.

In FIG. 2, the first multiplier 411 of the maximum power point tracker 410 multiplies the detected current value Ipv obtained at the input stage of the DC/AC converter 100 and the previously calculated OFF time toff to obtain an infinitesimal energy variation Δe(m).

The power calculation unit 412 of the maximum power point tracker 410 obtains the power variation ΔP by using the infinitesimal energy variation Δe(m) from the first multiplier 411 and the current variation ΔI by using the detected current value Ipv.

Also, as shown in FIG. 2, the current command value setting unit 413 of the maximum power point tracker 410 sets the current command value I*pv to allow power to track the maximum power point through the input stage of the DC/AC converter 100 by using the power variation ΔP and the current variation ΔI.

The OFF time calculation unit 414 of the maximum power point tracker 410 calculates an OFF time toff of the primary switch according to the control signal i*out generated based on the current command value I*pv and the carrier signal SCarr.

The power calculation unit 412 will now be described with reference to FIGS. 2 and 3.

As shown in FIGS. 2 and 3, the first calculation unit 412a of the power calculation unit 412 integrates the infinitesimal energy variation Δe(m) from the first multiplier 411 during one period (0~2π) of the system voltage to obtain the energy variation ΔE(n) as represented by Equation 1 shown below:

$$\Delta E(n) = \int_{t=0}^{2\pi} (\Delta e(m)) dt \text{ 여기서}, \Delta e(m) = Ipv[m] \times toff[m]$$

[Equation 1]

In Equation 1, ΔE[n] is a power variation at a certain sampling time point n, Ipv[m] is a detected current value at a certain sampling time point m, and toff[m] is an OFF time at a certain sampling time point m. Also, m is a sampling time point in synchronization with a zero crossing point of the carrier signal SCarr, and n is a sampling time point in synchronization with a zero crossing point (a multiple of 0~2π) of the system voltage.

The second calculation unit 412b of the power calculation unit 412 subtracts the previous energy variation ΔE(n−1) from the energy variation ΔE(n) to obtain the power variation ΔP as represented by Equation 2 shown below:

$$\Delta P = \Delta E[n] - \Delta E[n-1]$$ [Equation 2]

In Equation 2, ΔE[n] and ΔE[n−1] indicate energy variations at certain sampling time points n and n−1, respectively.

The third calculation unit 412c of the power calculation unit 412 subtracts the previously detected current value Ipv[n−1] from the detected current value Ipv[n] to obtain the current variation ΔI as represented by Equation 3 shown below:

$$\Delta I = \Delta P[n] - \Delta P[n-1]$$ [Equation 3]

In Equation 3, ΔP[n] and ΔP[n−1] indicate power variations at certain sampling time points n and n−1, respectively.

The current command value setting unit 413 will now be described with reference to FIGS. 2 and 4.

As shown in FIGS. 2 and 4, when the power variation ΔP is smaller than the power reference value and the current variation ΔI is greater than or the same as the pre-set current reference value, the first setting unit 413a of the power command value setting unit 413 sets the current command value I*pv by subtracting the pre-set step current variation Δi from the current command value I*pv.

When the power variation ΔP is smaller than the power reference value and the current variation ΔI is smaller than the pre-set current reference value, the second setting unit 413b of the current command value setting unit 413 sets the current command value I*pv by adding the pre-set step current variation Δi to the current command value I*pv.

When the power variation ΔP is greater than or the same as the power reference value and the current variation ΔI is greater than or the same as the pre-set current reference value, the third setting unit 413c of the current command value setting unit 413 sets the current command value I*pv by adding the pre-set step current variation Δi to the current command value I*pv.

When the power variation ΔP is greater than or the same as the power reference value and the current variation ΔI is smaller than the pre-set current reference value, the fourth setting unit 413d of the current command value setting unit 413 sets the current command value I*pv by subtracting the pre-set step current variation Δi from the current command value I*pv.

With reference to FIGS. 2 and 5, the OFF time calculation unit 414 may calculate the OFF time toff of the primary switch by using the instantaneous size $k_{ref}$ of the control signal I*out, the instantaneous maximum size Acarr of the pre-set carrier signal SCarr, and the period Tsw of the carrier signal, as represented by Equation 4 shown below:

$$toff = Tsw\left(1 - \frac{k_{ref}}{Acarr}\right)$$ [Equation 4]

In Equation 4, Tsw is the period (Tsw=1/fsw), fsw is the frequency of a carrier signal) of the carrier signal, $k_{ref}$ is an instantaneous size of the control signal i*out, and Acarr is an instantaneous maximum size of the carrier signal.

Also, with reference to FIG. 2, the compensation controller 421 of the first PWM controller 420 compensates for the control value by using the difference between the current command value I*pv and the detected current value Ipv from the maximum power point tracker 410.

The second multiplier 422 of the first PWM controller 420 generates the control signal I*out by multiplying the control value CV from the compensation controller 421 and the phase signal PS from the second PWM controller 440.

The first PWM generation unit 423 of the first PWM controller 420 generates the primary PWM signal SPWM10 for switching the primary switch by using the control signal i*out from the second multiplier 422 and the pre-set carrier signal SCarr.

The compensation controller 421 will now be described with reference to FIGS. 2 and 6.

As shown in FIGS. 2 and 6, the error compensator 421b of the compensation controller 421 compensates for the control value by using the difference from the error amplifier 421a. Here, a PI controller may be employed as the error compensator 421b.

With reference to FIGS. 2 and 7, the second multiplier 422 generates the control signal i*out in which the peak value of the phase signal from the second PWM controller 440 is as large as the size of the control value CV from the compensation controller 421.

With reference to FIGS. 2 and 8, when the first PWM generation unit 423 is configured as a comparator, the first PWM generation unit 423 generates the primary PWM signal SPWM10 having a pulse when the control signal i*out inputted through the non-inverting input stage from the second multiplier 422 is greater than the pre-set carrier signal SCarr inputted through the inverting input stage.

With reference to FIG. 2, the phase signal generation unit 441 of the second PWM controller 440 generates the phase signal PS by using the phase information (PI) of the phase detector 430 and provides the generated phase signal PS to the first PWM controller 420.

The second PWM generation unit 442 of the second PWM controller 440 generates the secondary first and second PWM signals SPWM21 and SPWM22, having the mutually opposing phases, by using the phase information PI from the phase detector 430.

FIG. 9 is a timing chart of major signals of the phase detector and the second PWM controller according to an exemplary embodiment of the present invention. In FIG. 9, Vgrid is a system voltage having a commercial cycle, the PI is phase information of the system voltage Vgrid, and the PS is a phase signal having a positive (+) unit size by using the phase information PI. SPWM21, synchronized with the system voltage, is a first PWM signal having a positive (+) pulse when the system voltage has a positive (+) value, and SPWM 22, synchronized with the phase of the system voltage, is a second PWM signal, having a positive (+) pulse when the system voltage has a negative (−) value.

The DC/AC converter 100 will now be described with reference to FIGS. 1 to 10. The primary DC chopper unit 110 of the DC/AC converter 100 includes the primary switch SW10 which performs switching according to the primary PWM signal SPWM. Also, the primary DC chopper unit 110 includes the input capacitor Cin connected to the zero stage of the input stage IN to remove an AC component such as a ripple, or the like, included in inputted DC electricity.

The transformer 120 delivers signal energy from the primary coil L10 connected between the primary switch SW10 and the input stage IN to the secondary coil L20.

In the AC/AC conversion unit 130, the secondary first switch SW21 connected to one end of the secondary coil L20 and the secondary second switch SW22 connected to the other end of the secondary coil L20 are synchronized with the phase of the system voltage Vgrid to alternately perform an ON or OFF operation to convert the signal delivered through the transformer 120 into an AC signal.

The operation of the DC/AC converter according to an exemplary embodiment of the present invention will now be described with reference to FIGS. 11a to 11d.

FIGS. 11a and 11b show operational states according to the first PWM signal SPWM21 having the positive (+) pulse when the system voltage Vgrid has a positive (+) phase. Specifically, FIG. 11a shows an operation when the primary switch SW10 is in an ON state, and FIG. 11b shows an operation when the primary switch SW10 is in an OFF state.

FIGS. 11c and 11d show operational states according to the second PWM signal SPWM22 having the positive (+) pulse when the system voltage Vgrid has a negative (−) phase. Specifically, FIG. 11c shows an operation when the primary switch SW10 is in an ON state, and FIG. 11d shows an operation when the primary switch SW10 is in an OFF state.

In FIG. 12, iLm is current flowing across a primary magnetized inductor Lm of the transformer, i10 is current flowing across the primary switch SW10, i21 is current flowing across the secondary first switch SW21, and i22 is current flowing across the secondary second switch SW22.

The method for tracking a maximum power point according to an exemplary embodiment of the present invention will now be described with reference to FIGS. 1 to 13.

In FIG. 13, the method for tracking a maximum power point according to an exemplary embodiment of the present invention can be applicable to the power conversion device having an insulating structure according to an exemplary embodiment of the present invention.

With reference to FIG. 13, in the OFF time calculation step (S100), the OFF time (toff) of the primary switch is calculated by using a control signal i*out generated based on the current command value I*pv and the carrier signal SCarr.

In the energy calculation step (S200), the infinitesimal energy variation $\Delta e(m)$ is obtained by multiplying the detected current value Ipv obtained from the input stage of the DC/AC converter 100 and the OFF time toff.

In the power calculation step (S300), the power variation $\Delta P$ is obtained by using the infinitesimal energy variation $\Delta e(m)$ and the current variation $\Delta I$ is obtained by using the detected current value Ipv.

In an example of implementation, the power calculation step (S300) may include the first calculation step (S310), the second calculation step (S320), and the third calculation step (S330).

In this case, in the first calculation step (S310), the energy variation $\Delta E(n)$ is obtained by integrating the infinitesimal energy variation $\Delta e(m)$ during one period (0~2π) of the system voltage, as represented by Equation 1 shown above.

In the second calculation step (S320), the power variation ($\Delta P$) is obtained by subtracting the previous energy variation $\Delta E(n-1)$ from the energy variation $\Delta E(n)$, as represented by Equation 2 shown above.

In the third calculation step (S330), the current variation $\Delta I$ is obtained by subtracting the previously detected current value Ipv[n−1] from the detected current value Ipv[n], as represented by Equation 3 shown above.

Then, in the current command value setting step (S400), the current command value I*pv is set to allow power to track the maximum power point through the input stage of the DC/AC converter 100 by using the power variation $\Delta P$ and the current variation $\Delta I$.

In an example of implementation, the current command value setting step (S400) may include the determination step (S410) and the setting step (S420).

In the determination step (S410), the sizes of the power variation ($\Delta P$) and the current variation ($\Delta I$) with respect to a pre-set power reference value and a pre-set current reference value are determined. In the setting step (S420), the current command value (I*pv) is set by arithmetically operating the detected current value (Ipv) and a pre-set variation ($\Delta i$) according to the determination result in the determination step (S410).

In an example of implementation of the determination step (S410), the determination step (S410) may include the first determination step (S411), the second determination step (S412), and the third determination step (S413).

In the first determination step (S411), whether or not the power variation ($\Delta P$) is greater than or the same as the pre-set power reference value is determined. In the second determination step (S412), whether or not the current variation ($\Delta I$) is greater than or the same as the pre-set current reference value is determined when the power variation ($\Delta P$) is greater than or the same as the pre-set power reference value. In the third determination step (S413), whether or not the current variation ($\Delta I$) is greater than the pre-set current reference value is determined when the power variation ($\Delta P$) is smaller than the pre-set power reference value.

In an example of implementation of the setting step (S420), the setting step (S420) may include the first setting step (S421), the second setting step (S422), the third setting step (S423), and the fourth setting step (S424).

In the first setting step (S421), when the power variation $\Delta P$ is smaller than a power reference value and the current variation ΔI is greater than or the same as a pre-set current reference value, the current command value I*pv is set by subtracting a pre-set step current variation Δi from the current command value I*pv.

In the second setting step (S422), when the power variation ΔP is smaller than the power reference value and the current variation ΔI is smaller than the pre-set current reference value, the current command value I*pv is set by adding the pre-set step current variation Δi to the current command value I*pv.

In the third setting step (S423), when the power variation ΔP is greater than or the same as the power reference value and the current variation ΔI is greater than or the same as the pre-set current reference value, the current command value I*pv is set by adding the pre-set step current variation Δi to the current command value I*pv.

In the fourth setting step (S424), when the power variation ΔP is greater than or the same as the power reference value and the current variation (ΔI) is smaller than the pre-set current reference value, the current command value I*pv is set by subtracting the pre-set step current variation Δi from the current command value.

In the OFF time calculation step (S100), the OFF time toff may be calculated as represented by Equation 4 shown above.

When the power conversion device having an insulating structure according to an exemplary embodiment of the present invention as described above is applied to a solar cell module system, it can be mounted generally as a module integrated converter (MIC) in each of solar cell modules to allow each of the solar cell modules to output maximum power. Also, compared with the related art in which a voltage sensor and a current sensor are required to control maximum power, in the present invention, the maximum power point is tracked by using a single current sensor, thus improving the overall energy conversion efficiency of the solar generation system and reducing the fabrication cost thereof.

As set forth above, according to exemplary embodiments of the invention, a maximum power operation can be performed by using a current value in a DC/AC converter that can be mounted in a solar cell module or applicable to a module integrated converter (MIC), without having to detect a voltage value, and accordingly, the DC/AC converter can be fabricated at a low cost.

While the present invention has been shown and described in connection with the exemplary embodiments, it will be apparent to those skilled in the art that modifications and variations can be made without departing from the spirit and scope of the invention as defined by the appended claims.

What is claimed is:

1. A maximum power point tracker applied to a DC/AC converter including a primary DC chopper unit having a primary switch, a transformer, and an AC/AC conversion unit including a secondary switch, the tracker comprising:
a first multiplier multiplying a detected current value obtained from an input stage of the DC/AC converter and a previously calculated OFF time to obtain an infinitesimal energy variation;
a power calculation unit obtaining a power variation by using the infinitesimal energy variation from the first multiplier and obtaining a current variation by using the detected current value;
a current command value setting unit setting a current command value to allow power to track a maximum power point through the input stage of the DC/AC converter by using the power variation and the current variation; and
an OFF time calculation unit calculating an OFF time of the primary switch according to a control signal generated based on the current command value and a carrier signal.

2. The tracker of claim 1, wherein the power calculation unit comprises:
a first calculation unit integrating the infinitesimal energy variation from the first multiplier during one period of a system voltage to obtain an energy variation;
a second calculation unit subtracting a previous energy variation from the energy variation to obtain a power variation; and
a third calculation unit subtracting a previously detected current value from the detected current value to obtain a current variation.

3. The tracker of claim 1, wherein the current command value setting unit comprises:
a first setting unit setting the current command value by subtracting a pre-set step current variation from the current command value when the power variation is smaller than a power reference value and the current variation is greater than or the same as a pre-set current reference value;
a second setting unit setting the current command value by adding the pre-set step current variation to the current command value when the power variation is smaller than the power reference value and the current variation is smaller than the pre-set current reference value;
a third setting unit setting the current command value by adding the pre-set step current variation to the current command value when the power variation is greater than or the same as the power reference value and the current variation is greater than or the same as the pre-set current reference value; and
a fourth setting unit setting the current command value by subtracting the pre-set step current variation from the current command value when the power variation is greater than or the same as the power reference value and the current variation is smaller than the pre-set current reference value.

4. A method for tracking a maximum power point applied to a power conversion device having an insulating structure including a DC/AC converter including a primary DC chopper unit having a primary switch, a transformer, and an AC/AC conversion unit including a secondary switch, the method comprising:
an OFF time calculation operation of calculating an OFF time of the primary switch by using a control signal generated based on a current command value and a carrier signal;
an energy calculation operation of obtaining an infinitesimal energy variation by multiplying a detected current value obtained from an input stage of the DC/AC converter and the OFF time;
a power calculation operation of obtaining a power variation by using the infinitesimal energy variation and obtaining a current variation by using the detected current value; and
a current command value setting operation of setting a current command value to allow power to track a maximum power point through the input stage of the DC/AC converter by using the power variation and the current variation.

5. The method of claim 4, wherein the power calculation operation comprises:
a first calculation operation of obtaining an energy variation by integrating the infinitesimal energy variation during one period of a system voltage;

a second calculation operation of obtaining a power variation by subtracting a previous energy variation from the energy variation; and a third calculation operation of obtaining a current variation by subtracting a previously detected current value from the detected current value.

6. The method of claim 5, wherein the current command value setting operation comprises:

a determination operation of determining the size of the power variation and the current variation with respect to a pre-set power reference value and a pre-set current reference value; and a setting operation of setting the current command value by arithmetically operating the detected current value and a pre-set variation according to the determination result of the determination operation 7. The method of claim 6, wherein the determination operation comprises:

a first determination operation of determining whether or not the power variation is greater than or the same as the pre-set power reference value;

a second determination operation of determining whether or not the current variation is greater than or the same as the pre-set current reference value when the power variation is greater than or the same as the pre-set power reference value; and a third determination operation of determining whether or not the current variation is greater than the pre-set current reference value when the power variation is smaller than the pre-set power reference value.

8. The method of claim 7, wherein the setting operation comprises:

a first setting operation of setting the current command value by subtracting a pre-set step current variation from the current command value when the power variation is smaller than a power reference value and the current variation is greater than or the same as a pre-set current reference value;

a second setting operation of setting the current command value by adding the pre-set step current variation to the current command value when the power variation is smaller than the power reference value and the current variation is smaller than the pre-set current reference value;

a third setting operation of setting the current command value by adding the pre-set step current variation to the current command value when the power variation is greater than or the same as the power reference value and the current variation is greater than or the same as the pre-set current reference value; and a fourth setting operation of setting the current command value by subtracting the pre-set step current variation from the current command value when the power variation is greater than or the same as the power reference value and the current variation is smaller than the pre-set current reference value.

* * * * *